United States Patent
Sugino et al.

(10) Patent No.: US 7,187,956 B2
(45) Date of Patent: Mar. 6, 2007

(54) PORTABLE COMMUNICATION APPARATUS AND MICROPHONE DEVICE FOR THE APPARATUS

(75) Inventors: Shigeru Sugino, Chiyoda-ku (JP); Kouji Saitou, Chiyoda-ku (JP); Toshiya Inubushi, Chiyoda-ku (JP); Shushin Noda, Yao (JP); Koji Nasu, Ikoma-gun (JP); Tomohiko Kamimura, Habikino (JP)

(73) Assignee: Hosiden Corporation, Osaka (JP)

( * ) Notice: Subject to any disclaimer, the term of this patent is extended or adjusted under 35 U.S.C. 154(b) by 491 days.

(21) Appl. No.: 10/245,901

(22) Filed: Sep. 17, 2002

(65) Prior Publication Data

US 2003/0064687 A1 Apr. 3, 2003

(30) Foreign Application Priority Data

Sep. 28, 2001 (JP) ............................. 2001-300295

(51) Int. Cl.
*H04M 1/00* (2006.01)

(52) U.S. Cl. ................ 455/575.3; 455/569.1; 455/575.1; 455/90.3; 379/433.01; 379/433.03

(58) Field of Classification Search ...... 455/90.1–90.3, 455/575.1, 575.3, 569.1–569.2, 550.1, 566; 379/433.01–433.3, 433.11, 433.13, 432, 434
See application file for complete search history.

(56) References Cited

U.S. PATENT DOCUMENTS

| 6,389,267 | B1 * | 5/2002 | Imai ........................... 455/90.1 |
| 6,751,487 | B1 * | 6/2004 | Rydbeck et al. ......... 455/575.3 |
| 2001/0029198 | A1 * | 10/2001 | Miyashita et al. .......... 455/575 |

FOREIGN PATENT DOCUMENTS

| JP | 5-48451 | 6/1993 |
| JP | 5-85144 | 11/1993 |
| JP | H11-32107 | 2/1999 |
| JP | H11-177664 | 7/1999 |
| JP | H11-308314 | 11/1999 |

* cited by examiner

*Primary Examiner*—Matthew D. Anderson
*Assistant Examiner*—Tuan Tran
(74) *Attorney, Agent, or Firm*—Koda & Androlia (57) ABSTRACT

In a portable communication apparatus of the invention, an inner wall (22) of an openable/closable member (2) faces the front face of a diaphragm of a close-talking microphone (5) via a sound path (64), and an outer sound hole (27) faces the rear face of the diaphragm of the close-talking microphone (5) via a sound path (65). An inner sound hole (26) is biasedly located in a position which is close to a free end of the openable/closable member (2), and the outer sound hole (27) is biasedly located in a position which is close to the center position of opening and closing movements of the openable/closable member (2), thereby obtaining a speech quality of a very high S/N ratio at a substantially same degree in both the cases where the openable/closable member (2) is opened, and where the member is closed.

1 Claim, 10 Drawing Sheets

PORTABLE COMMUNICATION APPARATUS AND MICROPHONE DEVICE FOR THE APPARATUS

BACKGROUND OF THE INVENTION

1. Field of the Invention

The present invention relates to a portable communication apparatus and a microphone device for the apparatus. In the portable communication apparatus and the microphone device for the apparatus according to the invention, an openable/closable member which incorporates a microphone is attached in an openable and closable manner to the main unit of the portable apparatus so that, in both the cases where the openable/closable member is opened, and where the member is closed, a speech quality of a very high S/N ratio can be obtained at a substantially same degree.

2. Description of the Prior Art

Japanese Patent Application Laying-Open No. 11-32107 (first prior art example) discloses a portable communication apparatus. In the disclosed portable communication apparatus, a microphone is incorporated into a flip which is screwed in an openable and closable manner to the main unit of the apparatus, and a sound-pick up hole for enabling the microphone to pick up a sound is opened in each of inner and outer flips of the flip, so that, when the flip is closed, the microphone can pick up a sound through the sound-pick up hole of the outer flip, and, when the flip is opened, the microphone can pick up a sound through the sound-pick up hole of the inner flip. In the publication, a cordless telephone and a portable telephone are indicated as the portable communication apparatus, and it is described that the portions where the sound-pick up holes of the outer and inner flips are opened are located in places which are close to the free end which is remote from the center position of the opening and closing movements of the flip.

Japanese Patent Application Laying-Open No. 11-308314 (second prior art example) discloses a telephone apparatus. In the telephone apparatus, a close-talking microphone (close-talking electret condenser microphone) having sound holes which are respectively in sides sandwiching a diaphragm is placed inside a movable member which is openably and closably attached to the main unit, and the sound holes are located in places which are close to the free end of the movable member. In the telephone apparatus, when the movable member is closed, one of the sound holes is closed and the other sound hole remains opened, so that the close-talking microphone functions as an omnidirectional microphone, and, when the movable member is opened, both the sound holes remain opened, so that the proximity effect is produced for a sound source close to one of the sound holes, to improve the speech quality.

Japanese Patent Application Laying-Open No. 11-177664 (third prior art example) discloses a microphone device for a portable telephone. According to the publication, an omnidirectional microphone is incorporated in a flip which covers the front face of a portable telephone in a manner similar to a folding type one, and sound holes are formed respectively in the front and back faces of a center portion in the longitudinal direction of the flip. In the microphone device for a portable telephone, both a sound wave which passes through the sound hole of the front face of the flip, and that which passes through the sound hole of the back face of the flip reach the front face of the ominidirectional microphone.

However, the first to third prior art examples have the following problems.

In the portable communication apparatus of the first prior art example, both the sound-pick up holes which are respectively formed in the outer and inner flips constituting the flip are positioned in places which are close to the free end of the flip. In the case where the sound-pick up holes are configured so that, when the flip is opened, the sound-pick up hole of the inner flip is positioned in the vicinity of the mouth, for example, the sound-pick up hole of the outer flip is remote from the mouth when the flip is closed. Therefore, the difference between the sound pressure applied to the microphone in the case where the flip is opened, and that in the case where the flip is closed becomes large, thereby causing a problem in that the speech qualities in the cases are remarkably different from each other. In the case where a close-talking microphone is used as the microphone incorporated in the flip as shown in the second prior art example, when the flip is closed, therefore, the mouth (sound source) is positioned in a place which is remote from the diaphragm of the close-talking microphone, and hence it seems that the sensitivity of the close-talking microphone is not enhanced and the speech quality is remarkably lowered.

The telephone apparatus of the second prior art example is configured so that, only when the movable member is opened, the close-talking microphone exerts the proximity effect, and, when the movable member is closed, the close-talking microphone functions as an ominidirectional microphone. Although a close-talking microphone is employed, when the movable member is closed, therefore, it is impossible to exert the effect of improving the speech quality by the proximity effect of the close-talking microphone. In the second prior art example, even if a configuration is assumed in which the proximity effect of the close-talking microphone can be exerted in both the cases where the movable member is opened, and where the member is closed, the proximity effect of the close-talking microphone cannot be expected in the case where the apparatus is configured so that, when the movable member is opened, the mouth is positioned in the vicinity of the sound hole and the close-talking microphone can exert the proximity effect. This is because of the following reason. When the movable member is closed, the mouth is remote from the sound holes because both the sound holes of the inner and outer sides in the close-talking microphone are positioned in the vicinity of the free end of the movable member.

In the microphone device for a portable telephone of the third prior art example, since the sound holes are formed respectively in the front and back faces of a center portion in the longitudinal direction of the flip, the positional relationship between the mouth and the corresponding sound hole when the flip is closed is identical with that when the flip is opened. However, the route along which a sound wave reaches the diaphragm of the microphone incorporated in the flip when the flip is opened is different from that when the flip is closed. When the flip is closed, particularly, a sound wave which passes through the sound hole of the back face of the flip reaches the front face of the microphone with going around the periphery of the case of the microphone. Therefore, it seems that, when the flip is closed, the speech quality is lowered.

SUMMARY OF THE INVENTION

The present invention has been conducted in view of the above-mentioned circumstances.

It is an object of the invention to provide a portable communication apparatus which can be configured so that, in both the cases where an openable/closable member corresponding to the flip or the movable member disclosed in the first to third prior art examples is opened, and where the member is closed, a speech quality can be obtained at a substantially same degree.

It is another object of the invention to provide a portable communication apparatus in which, in the case where a close-talking microphone is used, the speech quality is improved by the proximity effect of the close-talking microphone irrespective of whether an openable/closable member is opened or closed.

It is a further object of the invention to provide a microphone device for a portable communication apparatus which can be preferably employed in order to attain the objects.

The portable communication apparatus of the invention is a portable communication apparatus comprising: a main unit of the portable apparatus; a flat hollow openable/closable member which is attached in an openable and closable manner to the portable apparatus main unit; and a microphone which is placed inside the openable/closable member, wherein the apparatus has: the microphone that is configured by a bidirectional microphone in which a sound pressure is applied to a diaphragm from both front and rear sides; inner and outer sound holes which are opened respectively in inner and outer side walls of the openable/closable member, places where the sound holes are opened being shifted from each other in a far-and-near direction with respect to a center position of opening and closing movements of the openable/closable member; and sound paths which are formed inside the openable/closable member to allow the sound holes to face front and rear faces of the diaphragm, respectively.

In the portable communication apparatus, the microphone is placed in the flat hollow openable/closable member which is attached in an openable and closable manner to the main unit of the portable apparatus. The microphone is a bidirectional microphone which is configured so that a sound pressure is applied to the diaphragm from both front and rear sides. The inner and outer sound holes are opened respectively in the inner and outer side walls of the openable/closable member. The sound holes are caused to face the front and rear faces of the diaphragm through the sound paths formed inside the openable/closable member, respectively. The places where the sound holes are opened are shifted from each other in the far-and-near direction with respect to the center position of opening and closing movements of the openable/closable member.

According to the configuration, when the openable/closable member is opened, a sound wave which enters through the inner sound hole acts on the diaphragm from the front face side of the diaphragm via one of the sound paths, and, when the openable/closable member is closed, a sound wave which enters through the outer sound hole acts on the diaphragm from the rear face side of the diaphragm via the other sound path. Therefore, it is not required to form a sound path along which a sound wave goes around the periphery of the case of the microphone when the openable/closable member is closed. Consequently, a speech quality can be easily obtained at a substantially same degree in both the cases where the openable/closable member is opened, and where the member is closed. Since the configuration in which the places where the sound holes are opened are shifted from each other in the far-and-near direction with respect to the center position of opening and closing movements of the openable/closable member is employed, the position of one of the sound holes, and that of the other sound hole can be independently determined. Therefore, the positional relationship between the mouth (sound source) and the sound hole when the openable/closable member is opened can be easily made identical with that when the openable/closable member is closed, and the sound holes can be determined at positions which are close to the mouth in both the cases where the openable/closable member is opened, and where the member is closed. These are useful for improving the speech quality.

In the invention, preferably, the place where the inner sound hole is opened is remoter from the center position of opening and closing movements of the openable/closable member, than the place where the outer sound hole is opened. According to the configuration, the positions of the sound holes are close to the mouth in both the cases where the openable/closable member is opened, and where the member is closed, so that the speech quality is improved.

In the invention, preferably, the microphone is a close-talking microphone having a function in which a sensitivity is high with respect to a close sound source, and low with respect to a remote sound source, the inner sound hole is biasedly located in a position which is close to a free end of the openable/closable member, and the outer sound hole is biasedly located in a position which is close to the center position of opening and closing movements.

According to the configuration, the positions of the sound holes are close to the mouth in both the cases where the openable/closable member is opened, and where the member is closed, and a close-talking microphone is used as the microphone. Therefore, the proximity effect of the close-talking microphone can be exerted in both the cases where the openable/closable member is opened, and where the member is closed, so that an excellent speech quality is obtained. The configuration and the proximity effect of the close-talking microphone will be described in detail in the paragraph of the description of the preferred embodiment.

The microphone device for a portable communication apparatus of the invention is a microphone device for a portable communication apparatus that is to be placed inside a flat hollow openable/closable member which is attached in an openable and closable manner to a main unit of the portable apparatus, the microphone device having: a hollow case; a diaphragm which is incorporated into the case to partition an inner space of the case into front and rear chambers; front and rear sound holes which are opened in the case, the front sound hole facing the front chamber, the rear sound hole facing the rear chamber; a sound path which is formed inside the openable/closable member to cause the front sound hole to face an inner sound hole that is biasedly located in a position which is close to a free end of an inner wall of the openable/closable member; and another sound path which is formed inside the openable/closable member to cause the rear sound hole to face an outer sound hole that is biasedly located in a position which is close to a center position of opening and closing movements of the openable/closable member.

The microphone device is a microphone device for a portable communication apparatus that is to be placed inside the flat hollow openable/closable member which is attached in an openable and closable manner to the main unit of the portable apparatus. In the microphone device, the hollow case incorporates the diaphragm, and the inner space of the case is partitioned by the diaphragm into the front and rear chambers. The front sound hole facing the front chamber, and the rear sound hole facing the rear chamber are opened in the case. The front sound hole faces the inner sound hole that is biasedly located in a position which is close to the free end of the inner wall of the openable/closable member, via the sound path formed inside the openable/closable member, and the rear sound hole faces the outer sound hole that is biasedly located in a position which is close to the center position of opening and closing movements of the openable/closable member, via the other sound path formed inside the openable/closable member.

In the invention, both the pressure of a sound wave which enters the front chamber through the front sound hole, and that of a sound wave which enters the rear chamber through the rear sound hole are applied to the diaphragm. When a sound source is in a position which is close to the front sound hole and remote from the rear sound hole, a notable difference is produced between sound pressures respectively applied to the front and rear faces of the diaphragm, and the pressure applied to the front face of the diaphragm is very larger than that applied to the rear face. Therefore, the microphone exhibits a high sensitivity with respect to the sound wave which enters the front chamber through the front sound hole, and the sensitivity with respect to the sound wave which enters the rear chamber through the rear sound hole is very low. As a result, sound pickup of a large S/N ratio (with reduced noise) is enabled. This is called the proximity effect (noise canceling effect) of the close-talking microphone. By contrast, when a sound source is in a position which is close to the rear sound hole and remote from the front sound hole, a notable difference is produced between sound pressures respectively applied to the front and rear faces of the diaphragm, and the pressure applied to the rear face of the diaphragm is very larger than that applied to the front face. Therefore, the microphone exhibits a high sensitivity with respect to the sound wave which enters the rear chamber through the rear sound hole, and the sensitivity with respect to the sound wave which enters the front chamber through the front sound hole is very low. As a result, sound pickup of a large S/N ratio (with reduced noise) is enabled. In this case also, the close-talking microphone exerts the proximity effect.

Since the front sound hole faces the inner sound hole that is biasedly located in a position which is close to the free end of the inner wall of the openable/closable member, via the sound path formed inside the openable/closable member and the rear sound hole faces the outer sound hole that is biasedly located in a position which is close to the center position of opening and closing movements of the openable/closable member, via the other sound path formed inside the openable/closable member, the proximity effect of the close-talking microphone can be exerted in both the cases where the openable/closable member is opened, and where the member is closed, so that an excellent speech quality is obtained.

As described above, according to the portable communication apparatus and the microphone device for a portable communication apparatus of the invention, a speech quality of a very high S/N ratio can be obtained at a substantially same degree in both the cases where the openable/closable member is opened, and where the member is closed.

The configuration and function of the portable communication apparatus and the microphone device for a portable communication apparatus will become more apparent from the following description of embodiments.

DETAILED DESCRIPTION OF THE PREFERRED EMBODIMENT

Figure 1:
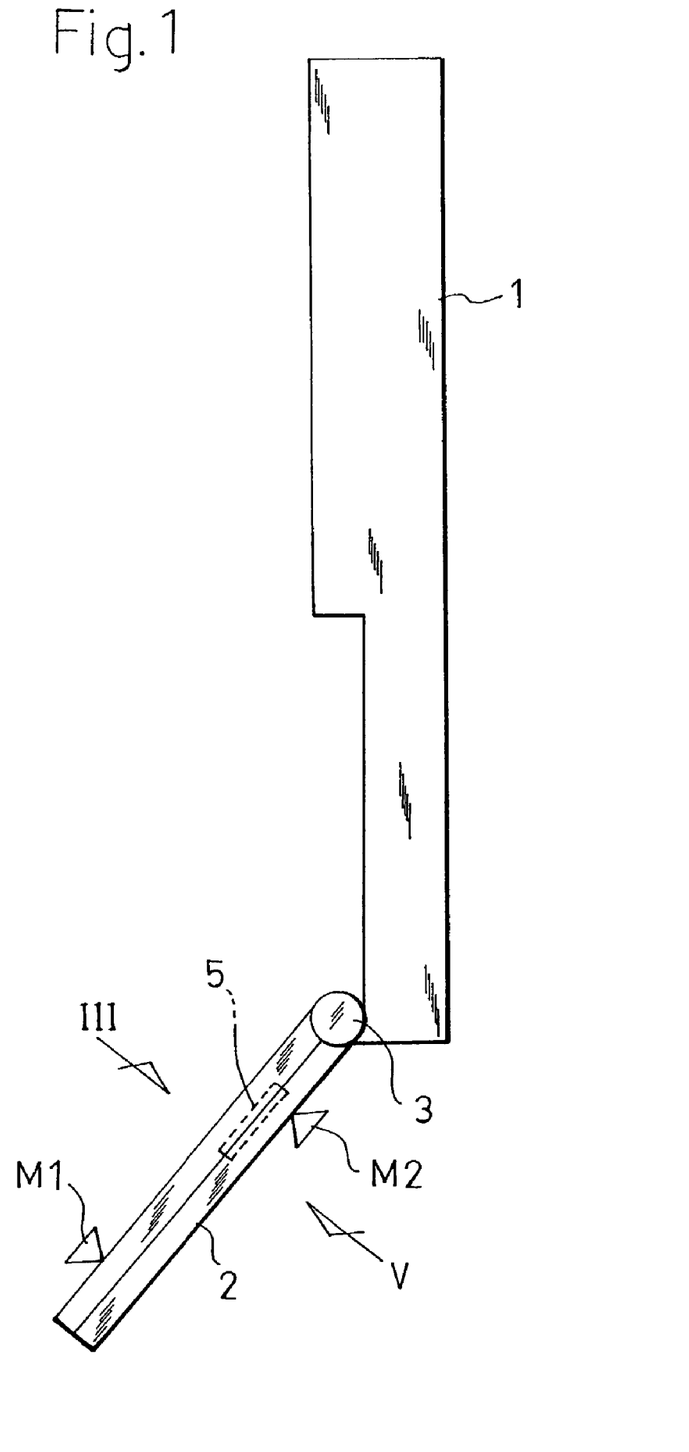
FIG. 1 is a schematic side view showing a state where an openable/closable member of the portable communication apparatus of the invention is opened.
Figure 2:
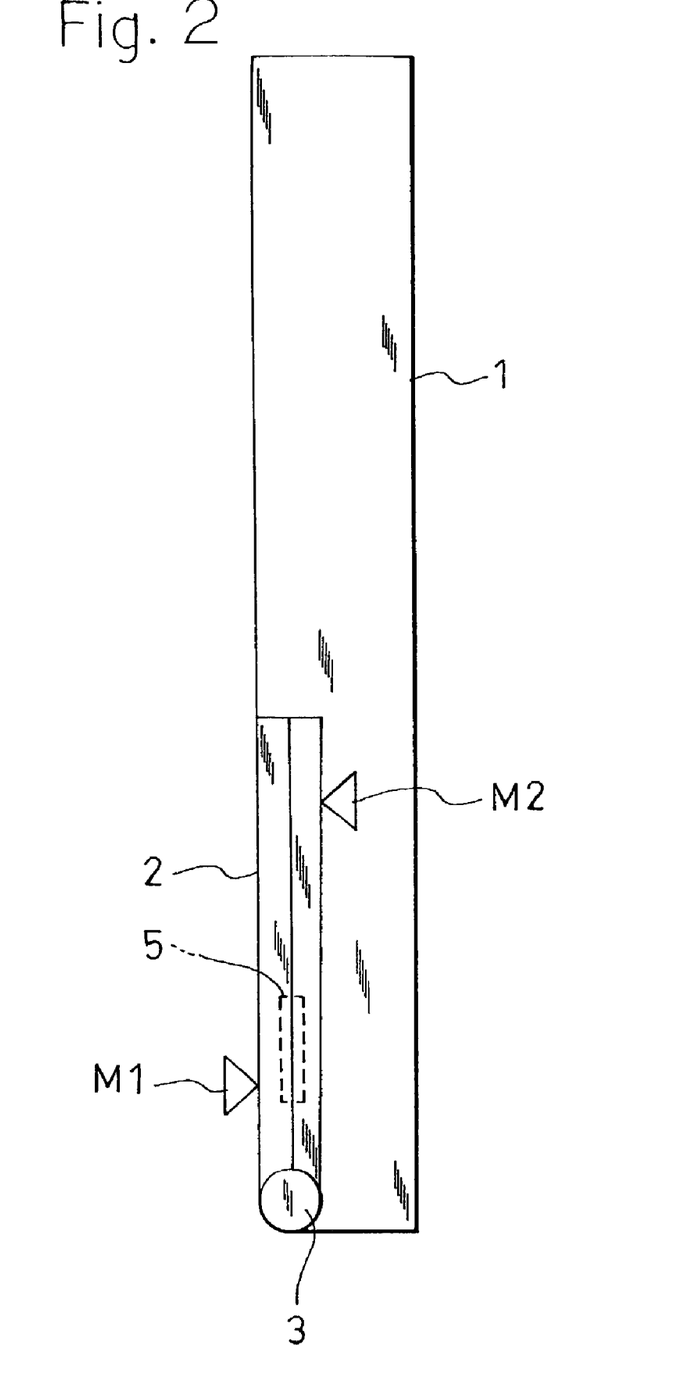
FIG. 2 is a schematic side view showing a state where the openable/closable member is closed.

Referring to FIGS. 1 and 2, 1 denotes the main unit of a portable apparatus, and 2 denotes an openable/closable member. The apparatus and the member are coupled to each other via a hinge 3 which is positioned in a lower end portion of the portable apparatus main unit 1, and which forms the center of opening and closing movements. A sound hole for the receiver, operation push buttons, a display device, and the like are arranged in the surface of the portable apparatus main unit 1.

Figure 3:
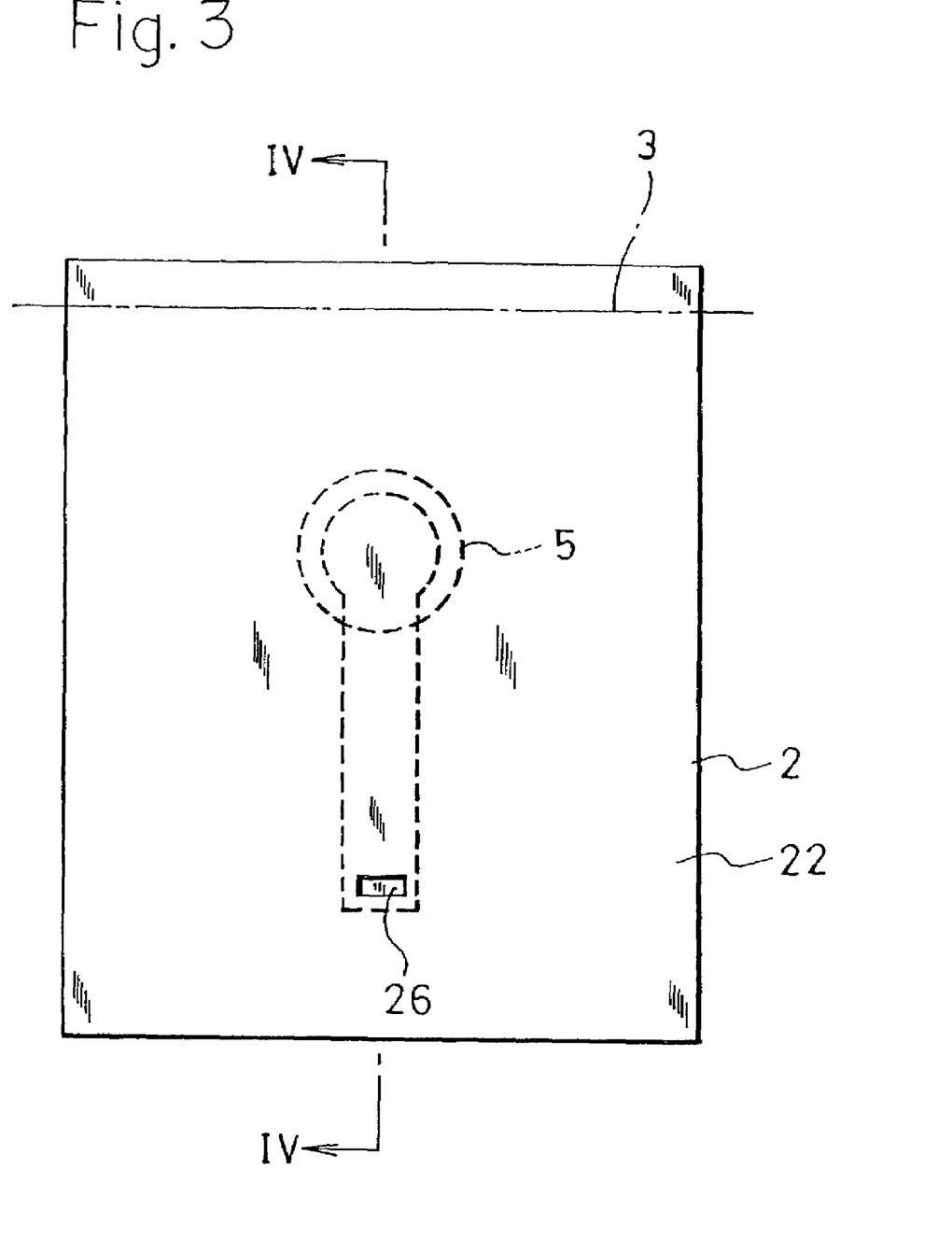
FIG. 3 is an enlarged view of the openable/closable member, looking in the direction of the arrow III in FIG. 1.
Figure 4:
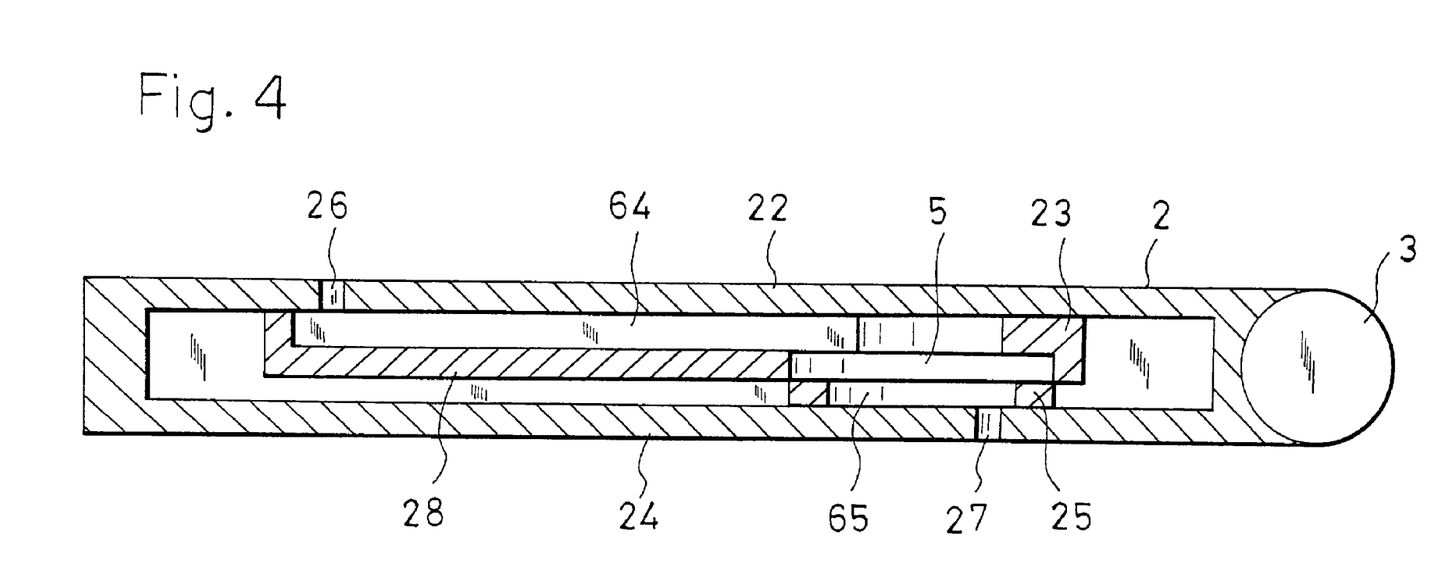
FIG. 4 is a schematic enlarged section view taken along the line IV—IV in FIG. 3.
Figure 5:
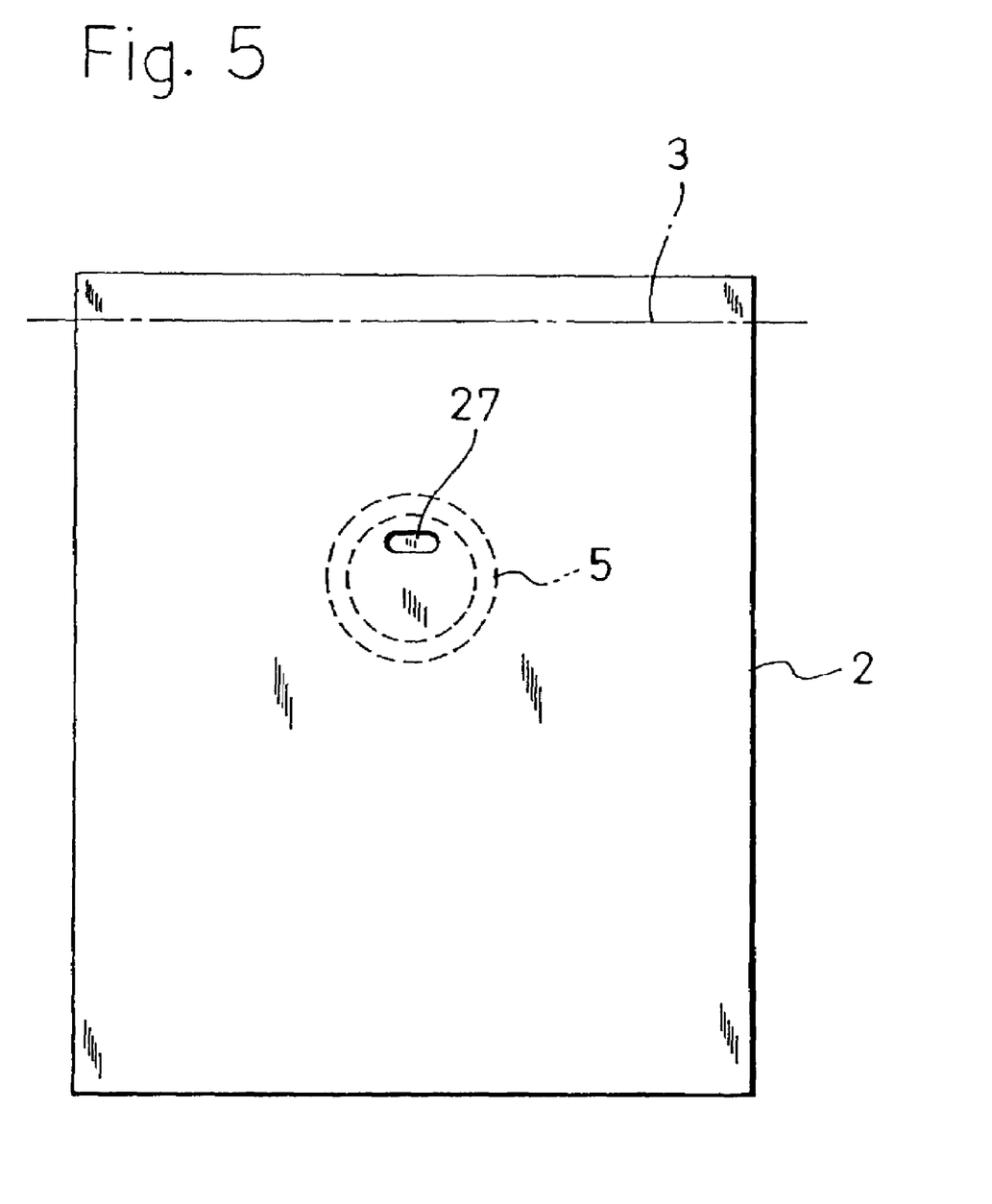
FIG. 5 is a view of the openable/closable member, looking in the direction of the arrow V in FIG. 1.
Figure 6:
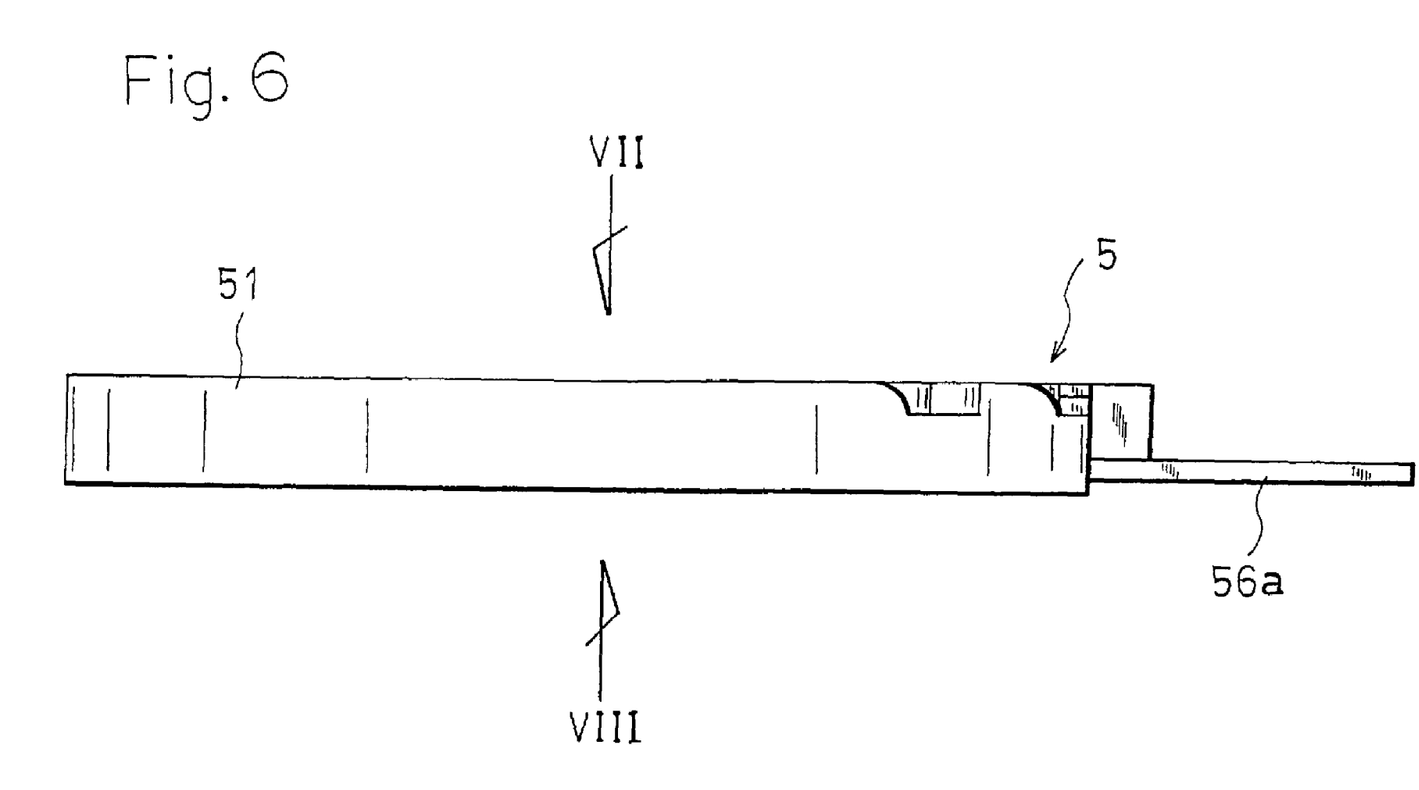
FIG. 6 is a schematic side view of a close-talking microphone.
Figure 7:
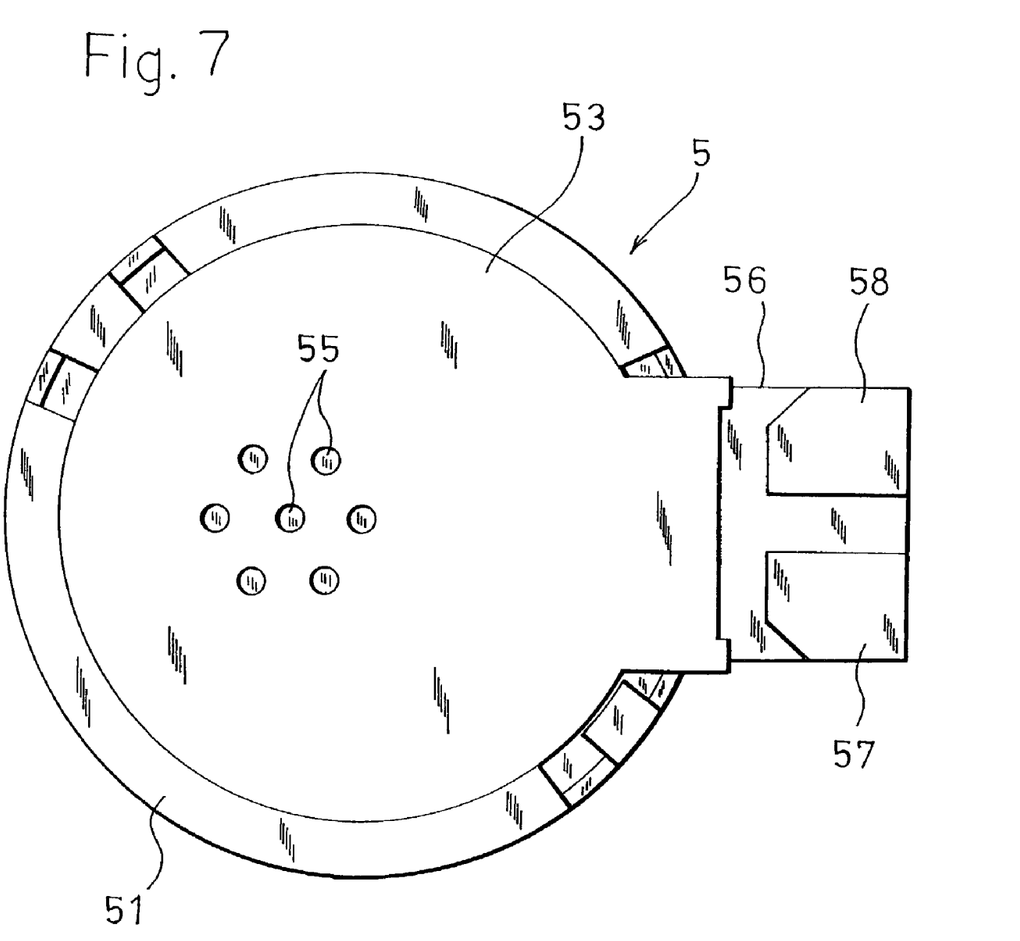
FIG. 7 is a view looking in the direction of the arrow VII in FIG. 6.
Figure 8:
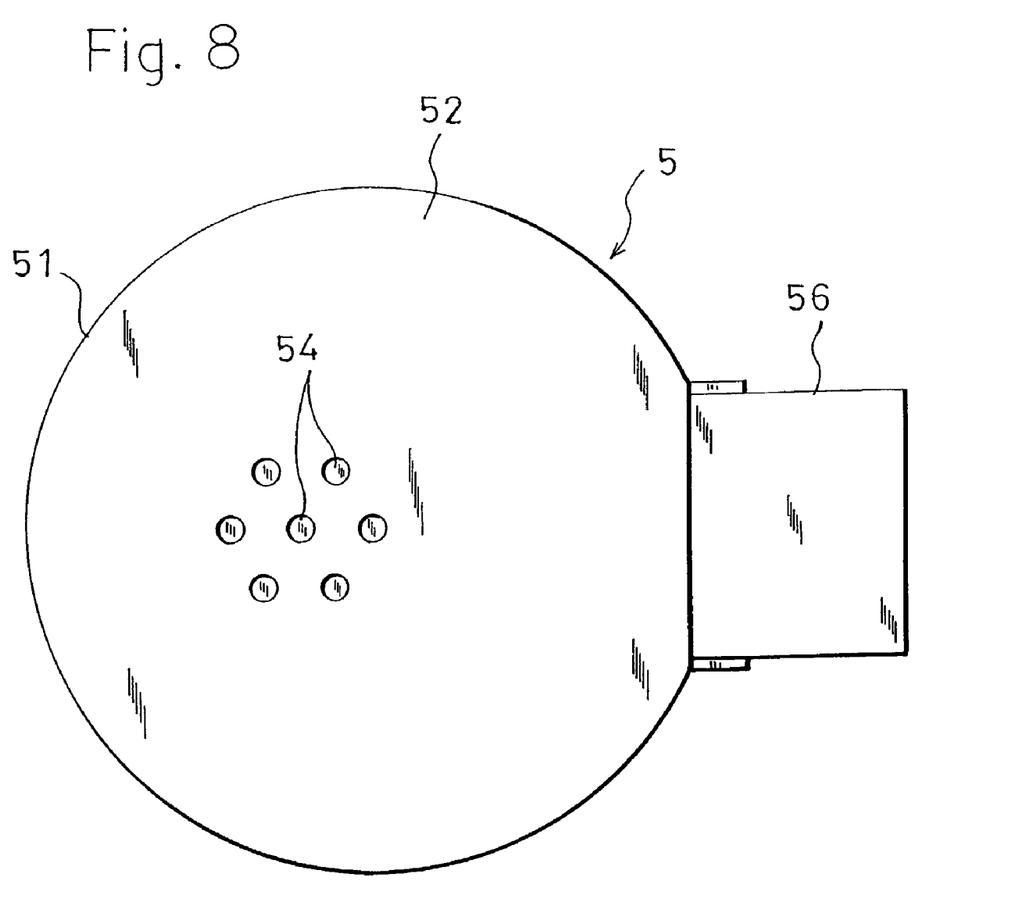
FIG. 8 is a view looking in the direction of the arrow VIII in FIG. 6.

As shown in FIGS. 3 to 5, the openable/closable member 2 is formed into a flat hollow shape. An inner sound hole 26 and an outer sound hole 27 are opened in an inner wall 22 and an outer wall 24 of the member, respectively. The places where the sound holes 26 and 27 are opened are shifted from each other in a far-and-near direction with respect to the center position of opening and closing movements of the openable/closable member 2, i.e., the center position of the hinge 3. Specifically, the inner sound hole 26 is biasedly located in a position which is close to the free end of the openable/closable member 2, and the outer sound hole 27 is biasedly located in a position which is close to the center position of opening and closing movements which is the center position of the hinge 3. In FIGS. 1 and 2, the place where the inner sound hole 26 is opened is indicted by a triangular mark M1, and the place where the outer sound hole 27 is opened is indicted by a triangular mark M2.

As indicated by the broken lines in FIGS. 1 and 2, a microphone 5 is placed inside the openable/closable member 2.

As shown in FIG. 4, the microphone 5 is formed into a flat shape, and clampingly held in a place in the vicinity of the hinge 3 by an arcuate support member 23 disposed on the inner wall 22 of the openable/closable member 2, and an annular support member 25 disposed on the outer wall 24. The microphone 5 is placed in an intermediate position between the walls 22 and 24. The microphone 5 is a bidirectional close-talking microphone. As shown in FIGS. 6 to 9, in the microphone 5, an opening of a flat circular case 51 is closed by a shield plate 53, and a front sound hole 54 and a rear sound hole 55 are opened in a front plate 52 of the case 51 and the shield plate 53, respectively. As illustratively shown in FIG. 9, a diaphragm 61 and a circuit board (not shown) are accommodated in the case 51, and the circuit board partly protrudes to the outside of the case 51. The protrusion portion 56 comprises a grounding terminal 57 and an output terminal 58. The inner space of the hollow case 51 is partitioned by the diaphragm 61 into a front chamber 62 and a rear chamber 63. The front sound hole 54 faces the front chamber, and the rear sound hole 55 faces the rear chamber 63.

As shown in FIG. 4, a partition plate portion 28 is disposed on the inner wall 22 of the openable/closable member 2. A sound path 64 through which the inner sound hole 26 communicates with the front sound hole 54 (see FIG. 8 or 9) of the microphone 5 is formed by the space surrounded by the partition plate portion 28. By contrast, a sound path 65 through which the outer sound hole 27 communicates with the rear sound hole 55 (see FIG. 7 or 9) of the microphone 5 is formed by the space surrounded by the annular support member 25 disposed on the outer wall 24 of the openable/closable member 2.

Figure 9:
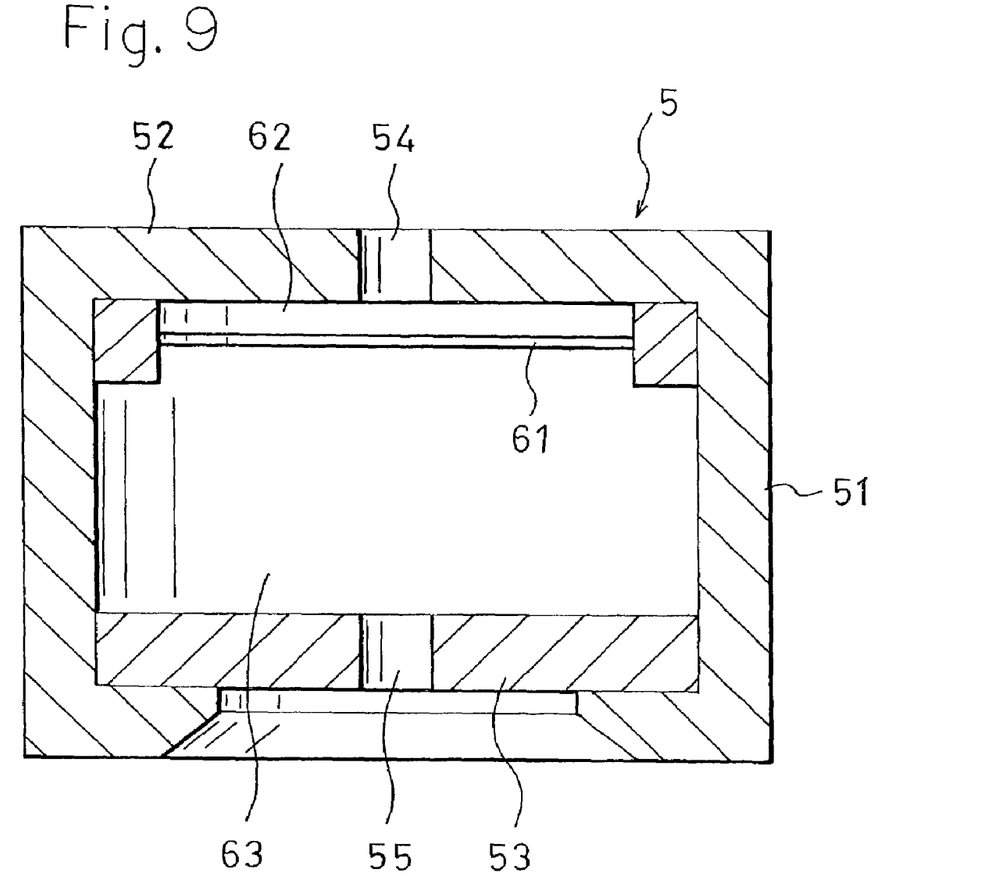
FIG. 9 is a diagram illustrating the structure of the microphone.

In the close-talking microphone having the basic configuration which has been described with reference to FIG. 9, both the pressure of a sound wave which enters the front chamber 62 through the front sound hole 54, and that of a sound wave which enters the rear chamber 63 through the rear sound hole 55 are applied to the diaphragm 61. At this time, when the sound source is in a position which is close to the front sound hole 54 and remote from the rear sound hole 55, a notable difference is produced between the pressures of the sound waves respectively applied to the front and rear faces of the diaphragm 61, and the pressure applied to the front face of the diaphragm 61 is very larger than that applied to the rear face. Therefore, the microphone exhibits a high sensitivity with respect to the sound wave which enters the front chamber 62 through the front sound hole 54, and the sensitivity with respect to the sound wave which enters the rear chamber 63 through the rear sound hole 55 is very low. As a result, sound pickup of a large S/N ratio (with reduced noise) is enabled. This is called the proximity effect of the close-talking microphone. By contrast, when a sound source is in a position which is close to the rear sound hole 55 and remote from the front sound hole 54, a notable difference is produced between sound pressures respectively applied to the front and rear faces of the diaphragm 61, and the pressure applied to the rear face of the diaphragm 61 is very larger than that applied to the front face. Therefore, the microphone exhibits a high sensitivity with respect to the sound wave which enters the rear chamber 63 through the rear sound hole 55, and the sensitivity with respect to the sound wave which enters the front chamber 62 through the front sound hole 54 is very low. As a result, sound pickup of a large S/N ratio (with reduced noise) is enabled. In this case also, the close-talking microphone exerts the proximity effect.

Figure 10:
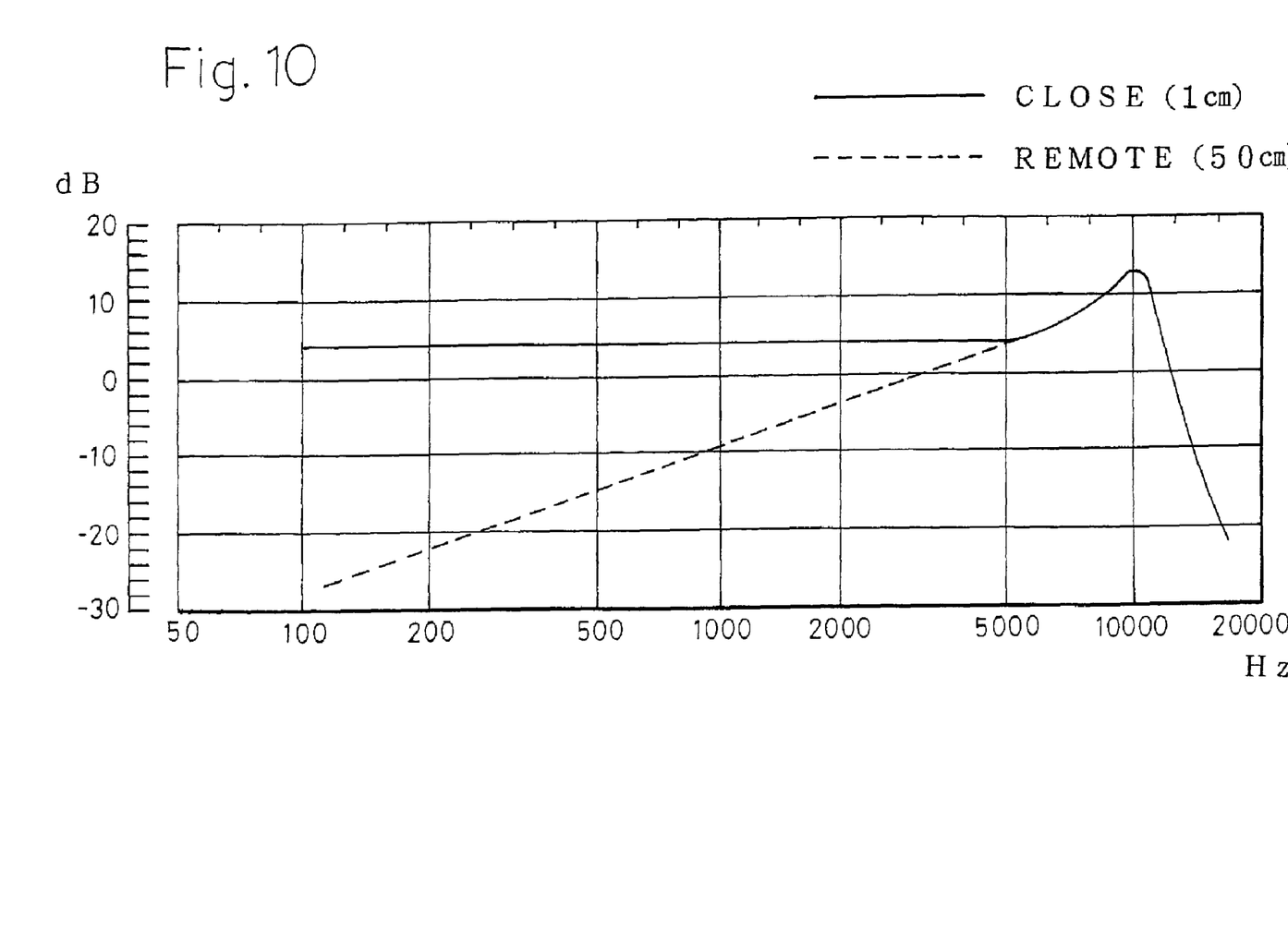
FIG. 10 is a view showing characteristic curves of the microphone.

FIG. 10 exemplarily shows characteristic curves illustrating the proximity effect. In the figure, the solid line shows a characteristic curve in the case where a sound source is in a position which is close (separated by 1 cm) to the diaphragm, and the broken line shows a characteristic curve in the case where a sound source is in a position which is remote (separated by 50 cm) from the diaphragm. As seen from the figure, when a sound source is in a position close to the diaphragm, a close-talking microphone exhibits a high sensitivity as indicated by the solid line, and, when a sound source is in a position remote from the diaphragm, the microphone exhibits a low sensitivity as indicated by the broken line, with the result that sound pickup of a very large S/N ratio is enabled.

In the portable communication apparatus of the embodiment described above, when the openable/closable member 2 is opened as shown in FIG. 1, a sound wave which enters through the inner sound hole 26 acts on the diaphragm 61 from the front face side of the diaphragm 61 via the sound path 64 and the front sound hole 54 of the microphone 5, and, when the openable/closable member 2 is closed as shown in FIG. 2, a sound wave which enters through the outer sound hole 27 acts on the diaphragm 61 from the rear face side of the diaphragm 61 via the other sound path 65 and the rear sound hole 55 of the microphone 5. Therefore, it is not required to form a sound path along which a sound wave goes around the periphery of the case 51 of the microphone 5 when the openable/closable member 2 is closed. Consequently, a speech quality can be easily obtained at a substantially same degree in both the cases where the openable/closable member 2 is opened, and where the member is closed. Particularly, the place where the inner sound hole 26 is opened is biasedly located in a position which is close to the free end of the openable/closable member 2, and the outer sound hole 27 is biasedly located in a position which is close to the center position of opening and closing movements of the openable/closable member 2. Therefore, the positions of the sound holes are close to the mouth in both the cases where the openable/closable member 2 is opened, and where the member is closed. Moreover, a close-talking microphone is used as the microphone 5. As a result, the proximity effect of the close-talking microphone can be exerted in both the cases where the openable/closable member is opened, and where the member is closed, so that an excellent speech quality is obtained.

In the embodiment, the distance between the inner sound hole 26 and the mouth when the openable/closable member 2 is opened is shorter than that between the outer sound hole 27 and the mouth when the openable/closable member 2 is closed, and the sound path 65 through which the outer sound hole 27 communicates with the rear sound hole 55 of the microphone 5 is shorter than the sound path 64 through which the inner sound hole 26 communicates with the front sound hole 54 of the microphone 5. Therefore, the proximity effect of the close-talking microphone can be exerted uniformly in both the cases where speech is conducted while the openable/closable member 2 is opened, and where speech is conducted while the openable/closable member 2 is closed. Consequently, the embodiment attains an effect that, irrespective of whether the openable/closable member 2 is opened or closed, a uniform stable speech quality of a very large S/N ratio can be obtained.

The entire disclosure of Japanese Patent Application No. 2001-300295 filed on Sep. 28, 2001 including specification, claims, drawings and summary are incorporated herein by reference in its entirety.

What is claimed is:

1. A portable communication apparatus comprising: a main unit of said portable apparatus; a flat hollow openable/closable member which is attached in an openable and closable manner to said portable apparatus main unit; and one microphone which is placed inside said openable/closable member, wherein said apparatus has:

said one microphone that is configured by a bidirectional microphone in which a sound pressure is applied to a diaphragm from both front and rear sides of said openable/closable member;

inner and outer sound holes which are opened respectively in inner and outer side walls of said openable/closable member, places where said sound holes are opened being shifted from each other in a far-and-near direction wit respect to a center position of opening and closing movements of said openable/closable member; and sound paths which are formed inside said openable/closable member to allow said sound holes to face front and rear faces of said diaphragm, respectively;

said microphone is a close-talking microphone having a function in which a sensitivity is high with respect to a close sound source, and low with respect to a remote sound source;

said inner sound hole is biasedly located in position which is close to a free end of said openable/closable member;

said outer sound hole is biasedly located in a position which is close to said center position of opening and closing movements;

said microphone is disposed at a place inside of the openable/closable member, the place being close to a center position of opening and closing movements; and the sound path connecting to the outer sound hole is shorter than the sound path connecting to the inner sound hole; and the sound path through which said inner sound hole communicates with said front face of said diaphragm of said microphone is formed by a space surrounding a partition plate portion disposed on said inner side wall of said openable/closable member;

whereby sound quality when said openable/closable member is open is substantially the same when the openable/closable member is close.

* * * * *